Feb. 13, 1951
H. M. WILSON
2,541,489
AMPLIFIER PROTECTIVE CIRCUIT
Filed July 22, 1949
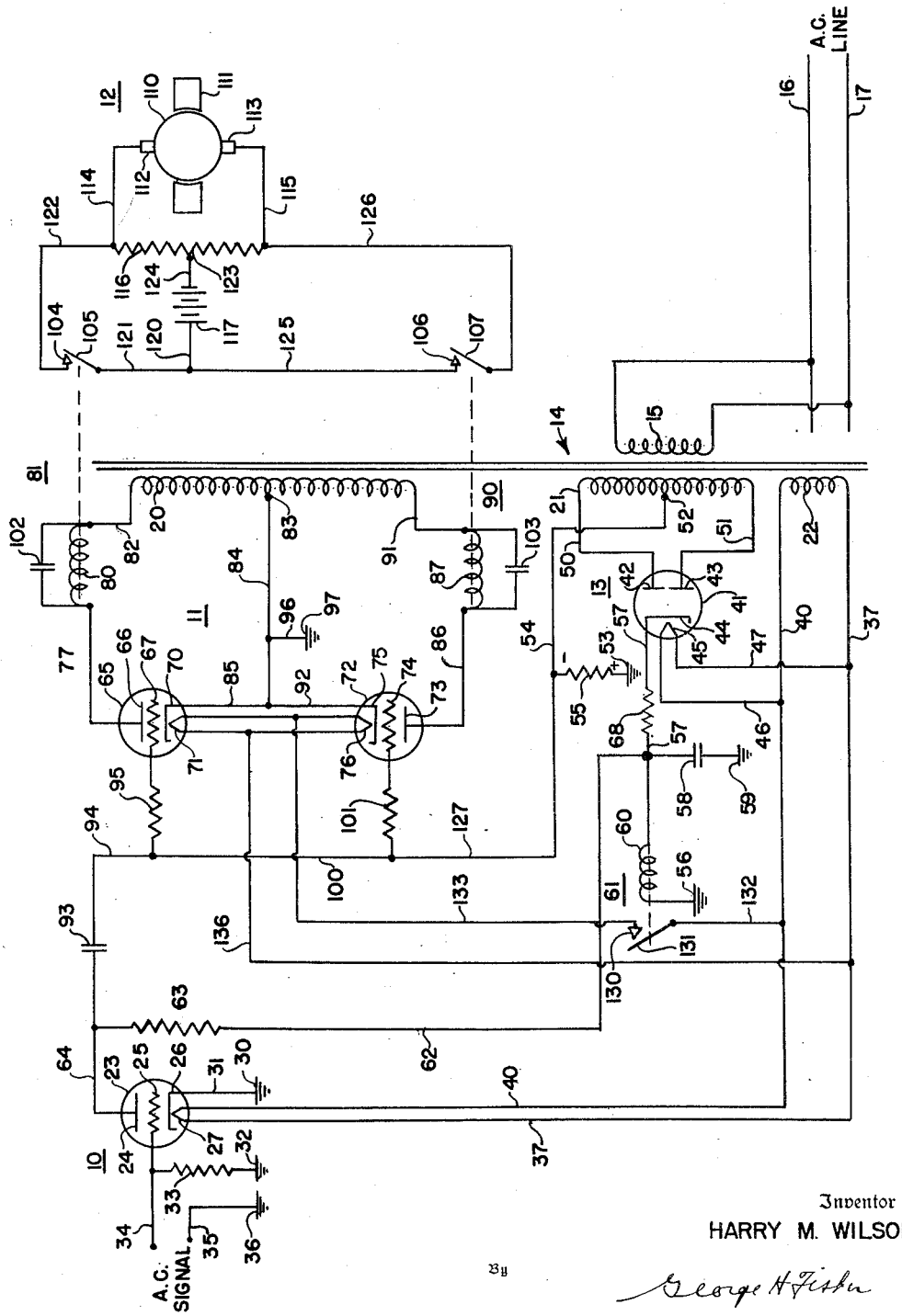
Inventor
HARRY M. WILSON
By George H Fisher
Attorney Patented Feb. 13, 1951

2,541,489

UNITED STATES PATENT OFFICE 2,541,489

AMPLIFIER PROTECTIVE CIRCUIT

Harry M. Wilson, Minneapolis, Minn., assignor to Minneapolis-Honeywell Regulator Company, Minneapolis, Minn., a corporation of Delaware Application July 22, 1949, Serial No. 106,227

9 Claims. (Cl. 315—107)

This invention relates generally to a protective circuit for an electronic control device and is more particularly concerned with preventing operation of the device when there is some operational failure.

In present day electronic control devices, it is necessary that there be provided means for rendering the control device inoperative whenever there are certain types of operational failures to prevent the control device from damaging controlled equipment. For example, in motor control circuits where electronic means are provided for energizing the same, it is essential that this electronic means not energize the motor or its circuits in such a manner as to cause damage thereto. If, as in the present arrangement, an alternating current powered amplifier and phase discriminator circuit is used to reversibly energize a controlled motor, the discriminator circuit must not operate to indicate a need for operation of the controlled motor in both directions at the same time as such indication would cause excess heating in the motor circuit. To prevent such heating, it is necessary that the discriminator circuit be so biased as to prevent operation of both sections thereof at the same time under normal operation and to render the discriminator circuit inoperative in the event there is a failure in the amplifier or power circuits feeding into the discriminator stage.

It is therefore an object of the present invention to provide for use with an electronic control having a phase discriminator circuit for preventing operation of the discriminator circuit when there is malfunctioning in the power supply circuits of the control.

A further object of the present invention is to provide for use with an electronic control having a phase discriminator circuit for rendering inoperative the discriminator circuit whenever a normal biasing voltage therein is removed.

Still another object of the present invention is to provide, in an electronic motor control circuit having thermionic discharge devices with cathode heaters, means for rendering said heaters ineffective when there is a power failure in the control circuit.

A still further object of the present invention is to provide, in an electronic motor control apparatus for a reversible motor, means to prevent energization of said motor in both directions at the same time to eliminate heating in the motor circuits.

These and other objects of the invention will be understood upon considering the following specification and drawing which shows a circuit embodying the features of the invention.

In the drawing a single amplifier stage 10 provides a signal input to an alternating current phase discriminator stage 11 which in turn controls a load device 12. A full wave rectifier circuit 13 provides the anode to cathode power supply for the amplifier stage. A transformer 14 having a primary 15 energized from alternating power line leads 16 and 17 furnishes the power for the rectifier circuit and the discriminator stage. Transformer 14 also has a secondary 20 center tapped at terminal 83, a secondary 21, center tapped at terminal 52, and a further secondary 22.

Amplifier stage 10 comprises a tube 23 having an anode 24, a control electrode 25, a cathode 26 and a cathode heater 27, the latter of which is energized from transformer secondary 22 through leads 37 and 40. The cathode 26 is connected to a ground terminal 30 through lead 31. The control electrode 25 is connected to a ground terminal 32 through a grid resistor 33. An alternating voltage control signal normally is impressed between the control electrode 25 and cathode 26 through input leads 34 and 35. Lead 35 is connected to a ground terminal 36.

The full wave rectifier stage 13 comprises a tube 41 having a pair of anodes 42 and 43, a cathode 44 and a cathode heater 45. The heater 45 is connected to transformer secondary 22 through leads 40 and 46, and leads 47 and 37. Anodes 42 and 43 of the rectifier tube are connected to the opposite terminals of transformer secondary 21 through leads 50 and 51.

A filtering capacitor 58 is connected to the cathode 44 of rectifier tube 41 through resistor 68 to smooth the output from the rectifier. The other plate of the capacitor is connected to ground terminal 59.

Located in the cathode circuit of rectifier tube 41 is a control relay 61 having a relay winding 60 which is operable when energized to move an associated switch blade 131 into engagement with an associated switch contact 130. Also associated with the rectifier portion of the apparatus is a biasing resistor 55. A complete electrical circuit may be traced from the end terminals of the secondary 21, through conductors 50 and 51 to anodes 42 and 43 respectively, cathode 44, lead 57, relay winding 60, grounds 56 and 53, resistor 55 and lead 54 back to tap 52 on secondary 21. When there is current flowing in the last traced circuit, there will be a voltage drop across the relay winding 60 such that the right hand terminal will be positive with respect to the grounded terminal. There will also be a voltage drop across the biasing resistor 55 such that the upper terminal will be negative with respect to the lower or ground terminal.

The supply voltage for the amplifier stage 10 is taken from the voltage drop across the relay winding 60. This supply circuit may be traced from the right end of winding 60, or the positive end, through lead 62, plate load resistor 63, lead 64, anode 24, cathode 26, lead 31, and grounds 30 and 56 back to the relay winding 60. A coupling capacitor 93 is located between the output of amplifier stage 10 and the input of discriminator stage 11.

Discriminator stage 11 comprises a pair of tubes 65 and 72. Tube 65 has an anode 66, a control electrode 67, a cathode 70, and a cathode heater 71. Tube 72 has an anode 73, a control electrode 74, a cathode 75, and a cathode heater 76. Located in the output of the tube 65 is a control relay 81 which has a relay winding 80 and a switch blade 105 normally biased out of engagement with an associated switch contact 104. Located in the output of tube 72 is a further control relay 90 having a relay winding 87 and a switch blade 107 which is normally biased out of engagement with an associated contact 106. Capacitors 102 and 103 are connected in parallel with relay windings 80 and 87, respectively, to bypass alternating current flowing in the output circuits of tubes 65 and 72 and to maintain the relays continuously energized when there is current flowing in the outputs. A pair of grid current limiting resistors, 95 and 101 are connected to control electrodes 67 and 74, respectively. The discriminator tubes 65 and 72 are so connected to the secondary 20 that the tubes will be normally conductive on opposite half cycles of the alternating power source. The circuit for tube 65 may be traced from the upper terminal of secondary 20 through lead 82, winding 80, lead 77, anode 66, cathode 70, leads 85 and 84 back to the tap 83 on secondary 20. The circuit for tube 72 may be traced from the lower terminal of secondary 20, through lead 91, winding 87, lead 86, anode 73, cathode 75, leads 92 and 84 to the tap 83 on secondary 20.

Controlled by the relays 81 and 90 is the load device 12 which comprises a reversible motor having a rotor 110, a permanent magnet field 111 and a pair of brushes 112 and 113 making connection to the armature 110. Supplying power to the motor is a battery 117 which may be connected in parallel with a portion of a resistor 116, center tapped at 123. The brushes 112 and 113 are connected through leads 114 and 115 to the ends of resistor 116 so that the armature 110 will have a voltage applied thereto whenever either of relays 81 or 90 are energized to close their respective contacts 104—105, or 106—107, to connect the battery 117 to the resistor 116. The polarity of the voltage on resistor 116 will be dependent upon which of the relays, 81 or 90, is operative. The reversal of polarity will cause reversal of operation of the rotor 110.

Operation

In considering the operation of the present invention, it will be first assumed that the apparatus is completely deenergized with no power being supplied to the input power leads 16 and 17. Under these circumstances, the apparatus will be deenergized and the components will be in the position shown upon the drawing. This will mean that all of the control relays will be deenergized and their associate switch contacts will be open.

As soon as power is applied to the input power lines 16 and 17, power will be supplied to the primary winding 15 of transformer 14. With the power being supplied to transformer 14, the secondary 22 will be supplying an energizing voltage for the cathode heater 46 of rectifier 41 and the cathode heater 27 of amplifier tube 23. After these cathode heaters have been energized for a predetermined time, their associated cathodes will become electron emissive and it will be possible for current to flow through the tube. When current starts to flow through the rectifier tube 41, through the circuit as traced above, the current flow will cause a voltage drop across the relay winding 60 and a further voltage drop across the biasing resistor 55. When the current flow becomes great enough, the relay 61 will become sufficiently energized to move the switch blade 131 into engagement with contact 130. The closing of these contacts will result in the supplying of power to the cathode heaters 71 and 76 of discriminator tubes 65 and 72 respectively. This energizing circuit may be traced from the upper terminal of secondary 22 through leads 40 and 132, switch blade 131, switch contact 130, lead 133, heaters 71 and 76, connected in parallel, leads 136 and 37 back to the lower terminal of secondary 22.

When the current flow in the rectifier circuit is sufficient to energize the control relay 61, the voltage drop across the biasing resistor 55 will be sufficient to apply an appreciably negative voltage to the control electrodes 67 and 74 of discriminator tubes 65 and 72, respectively. This biasing voltage may be traced from the upper, or negative terminal of biasing resistor 55 through lead 127 and resistor 101 to control electrode 74 and from leads 127 and 100 and resistor 95 to control electrode 67. Inasmuch as the lower terminal of resistor 55 is connected to ground 53 and the cathodes 70 and 75 of the discriminator tube are connected to ground at 97, there will be applied to the control electrodes of the discriminator tubes a voltage which is sufficiently negative on the control electrodes to maintain both of these tubes non-conductive in the absence of any further control signals on the input to the tubes.

When there is a voltage across the relay 61 which is sufficient to energize the same, that voltage will also be sufficient to supply an energizing voltage for the amplifier tube 23 so that when the cathode heater of tube 23 has heated the associated cathode to be electron emissive, there will be current flow in the amplifier stage which will make possible the amplifying of any input signals to the circuit.

In the absence of an input signal to the amplifier stage 10, and with power supplied to the transformer 14, the relay 61 will be energized and the control relays 81 and 90 will be deenergized since their associated discriminator tubes 65 and 72 will be biased to be nonconductive by the voltage drop across the biasing resistor 55. As soon as an input signal is applied to the input leads 34 and 35, this signal will be amplified by the amplifier tube 23 and the signal will pass through the coupling capacitor 93 and be applied to the control electrodes 67 and 74 of the discriminator tubes 65 and 72.

The frequency of the input signal will correspond to the frequency of the power supply on input leads 16 and 17 but the phase of the input signal on leads 34 and 35 may be reversed by any suitable control device, not shown. The phasing of the input signal will determine which of the discriminator tubes will be conductive. If the phasing on the output of the amplifier tube 23 is such that the control electrode 67 will be on the positive half cycle when the anode 66 is positive, the tube 65 will be conductive to energize the control relay winding 80. If the control signal on the output of amplifier tube 10 is reversed in phase, the control electrode 74 will be positive on the opposite half cycle and will be positive at the same time that the anode 73 is positive so that the tube 72 will be conductive to energize the control relay winding 87. When either of relays 81 or 90 is energized, the corresponding contact in load circuit 12 will be energized and the battery 117 will be connected to resistor 116 to cause rotation of the rotor 110 in one direction or the other depending upon which of the relays is energized. It should be noted that in the absence of any control signal, the negative bias on the control electrode 67 and 74 is sufficient to maintain both of the tubes 65 and 72 nonconductive so that the relays 81 and 90 will be deenergized. It is therefore necessary that the input control signal from the amplifier tube 10 be sufficient to overcome this negative bias to render either of tubes 65 or 72 conductive.

In the event there should be a failure in the rectifier circuit, it is essential that the discriminator tubes 65 and 72 be rendered inoperative to prevent energization of relays 81 and 90. Upon such a failure, there will be no direct current voltage supply to the amplifier stage 10 and therefore any input control signals will not be amplified. Also, upon a failure of the rectifier circuit, there will be no biasing voltage across the resistor 55. With no biasing voltage across the resistor 55 the control electrodes 67 and 74 will tend to assume the same potential as the cathodes 70 and 75 and, lacking further protection, the discriminator tubes 65 and 72 will become conductive to energize relays 81 and 90 at the same time. By providing the relay 61 in the rectifier circuit and arranging these circuits so that the relay is energized only when the rectifier is operating properly, it will be seen that a failure of the rectifier will cause the relay to be deenergized so that switch blade 131 will move out of engagement with switch contact 130. The opening of this switch contact will result in the deenergization of the heaters 71 and 76 and the discriminator tubes will be rendered inoperative.

In the event that the relays 81 and 90 were both energized at the same time by the discriminator tubes 65 and 72, both sets of relay contacts 104—105 and 106—107 in the load circuit would be closed so that the battery 117 would be connected across the upper and lower portions of resistor 116. Such a connection as this will cause excess heating in the resistor and is apt to cause damage thereto. There is also a tendency, with both of the relays energized, for the motor to drift as the electrical circuit may not be completely balanced so that there will be circulating current flowing through the rotor 110 causing it to rotate. Thus, by opening the cathode heater circuit of the discriminator tubes 65 and 72, it is possible to prevent energization of the control relays 81 and 90 whenever there has been a failure in the rectifier circuit 13.

It will be seen from the above that there has been provided a circuit for protecting against failures in the control apparatus which might cause damage to the control or load circuits. It will further be noted that the protective circuits have been utilized to supply operating voltages for the rest of the control apparatus when the rectifier circuit is operating normally.

It is to be understood that I have shown only one embodiment of my invention and various modifications thereof will be readily apparent to those skilled in the art. I have therefore intended the scope of the present invention to be limited solely by the appended claims.

I claim as my invention:

1. An electronic circuit comprising, in combination: a first stage including an electron tube; a second stage including a first electron tube and a second electron tube each having an anode, a cathode, a cathode heater and a control electrode; a rectifier stage; a relay connected in the output circuit of said rectifier, said relay comprising a relay winding and a pair of contacts; an alternating voltage source; means connecting said source in energizing relation to said heaters, said rectifier stage and said tubes in said electrical connections between said rectifier stage and the tube in said first stage such that the output from said rectifier stage supplies an energizing voltage to the tube in said first stage; electrical connections between said rectifier stage and the control electrodes and cathodes in the tubes in said second stage such that operation of said rectifier stage results in a negative potential being impressed on said control electrodes with respect to said cathodes; and means including said relay for opening the energizing circuit to said heaters upon said rectifier stage being inoperative.

2. An electronic protective circuit comprising in combination; an amplifier circuit including an electronic discharge device having a cathode, an anode, and a control electrode, an alternating source of current, a current responsive means, and circuit means connecting directly in series said cathode, said anode, said source of current, and said responsive means; a rectification circuit connected to apply a control voltage to said discharge device, said circuit including a rectifier, a second source of alternating current, and circuit means connecting in series said rectifier and said second source of current, said rectification circuit having a pair of terminals thereon; current responsive means connected to said terminals; and means including said responsive means connected in controlling relation to said first alternating source of current to effect energization of said amplifier only when said rectification circuit is operative.

3. In combination: a first circuit comprising an electron tube including an anode and cathode; a second circuit comprising first and second electron tubes each including an anode, a cathode and a cathode heater; a third circuit comprising a rectifier; means energizing said tubes in said second circuit, said rectifier, and said heaters in the tubes in said second circuit; electrical connections between said tube in said first circuit and the rectifier output circuit such that operation of said rectifier causes a positive potential to be impressed upon the anode of the tube in the first circuit with respect to the cathode; current responsive means; and means including said responsive means connected in controlling relation to said means energizing said heaters to effect energization of said heaters only when said rectifier is operative.

4. In combination: a first electron tube including an anode and a cathode; a second and a third electron tube each including an anode, a cathode, a control electrode and a cathode heater; a rectifier; means energizing said second and said third tubes, said heaters and said rectifier; electrical connections between said first tube and the rectifier output circuit such that said first tube has a positive anode potential with respect to its cathode upon energization of said rectifier; a resistor connected in the rectifier output circuit and the control electrode to cathode circuits of said second and said third tubes, said resistor having a voltage drop thereacross upon conduction of said rectifier, said voltage drop being effective to place a negative potential on the control electrodes of said second and said third tubes with respect to the cathodes; and a relay having a winding in the output circuit of the rectifier, said relay being effective when energized to complete the energizing circuit to the heaters of said second and said third tubes.

5. An electronic protective circuit comprising in combination; a discriminator circuit including a pair of electronic discharge devices each having an anode, a cathode, and a control electrode, a source of alternating current, said source having two end terminals and a center tap thereon, a pair of current responsive devices, circuit means connecting one of said anodes through one of said current responsive devices to one of said end terminals, circuit means connecting the other of said anodes through the other of said current responsive devices to the other of said end terminals, circuit means connecting said cathodes to said center tap; a rectification circuit connected to apply a control voltage to said discharge devices, said circuit including a rectifier, a second source of alternating current, and circuit means interconnecting said rectifier and said second source of alternating current, said rectification circuit having a pair of terminals thereon; condition responsive means connected to said terminals; and means including said condition responsive means connected in controlling relation to said first source of alternating current to effect energization of said discriminator circuit only when said rectification circuit is operative.

6. In combination: a first circuit comprising an electron tube including an anode and a cathode; a second circuit comprising an electron tube including an anode, a cathode and a cathode heater; a third circuit comprising a rectifier; means energizing said tube in said second circuit, said rectifier and said heater in the tube in said second circuit; an electrical connection between the anode and cathode of the tube in said first circuit and the rectifier output circuit such that operation of said rectifier results in a positive potential being impressed upon the anode of the tube in said first circuit with respect to the cathode; current responsive means; and means including said responsive means connected in controlling relation to said means energizing said heater to effect energization of said heater only when said third circuit is operative.

7. In combination: a first circuit comprising an electron tube including an anode and a cathode; a second circuit comprising an electron tube including an anode, a cathode, a cathode heater and a control electrode; a third circuit comprising a rectifier tube; means energizing said tubes in said second and third circuits and said heater in the tube in the said second circuit; electrical connections between said tube in said first circuit and the rectifier tube output circuit such that said tube in said first circuit is energized upon operation of said rectifier tube; electrical connections between the control electrode and cathode of the tube in said second circuit and the rectifier tube output circuit such that operation of said rectifier tube impresses a negative potential on the control electrode with respect to the cathode; current responsive means; and means including said responsive means connected in controlling relation to said means energizing said heater to effect energization of said heater only when said third circuit is operative.

8. In combination: an alternating current phase discriminator circuit comprising a first and a second tube each having an anode, a cathode, a cathode heater and a control electrode; a rectifier; a relay having a winding in the rectifier output circuit; a resistor in the rectifier output circuit; means energizing said discriminator circuit, said rectifier and said cathode heaters; means connecting said relay in said heater energizing circuits such that energization of said relay winding upon energization of said rectifier operates to close the contacts of said relay to complete the energizing circuits to said heaters; and said resistor being connected between the control electrodes and cathodes of the tubes in said discriminator circuit such that a voltage drop across said resistor due to energization of said rectifier operates to place a negative voltage on said control electrodes with respect to said cathodes.

9. In combination: a first electron tube comprising an anode and a cathode; an alternating current phase discriminator circuit comprising a second and a third tube each having an anode, a cathode, a cathode heater and a control electrode; an input circuit and an output circuit for said first tube; an input circuit and an output circuit for said discriminator circuit means connecting the output circuit for said first tube to the input circuit for said discriminator circuit; a rectifier; a relay having a winding in the rectifier output circuit; a resistor in the rectifier output circuit; means energizing said discriminator circuit, said rectifier and said cathode heaters; means connecting said relay in said heater energizing circuits such that energization of said relay winding upon energization of said rectifier operates to close the contacts of said relay to complete the energizing circuits to said heaters; said resistor being connected between the control electrodes and cathodes of the tubes in said discriminator circuit such that a voltage drop across said resistor due to energization of said rectifier operates to place a negative voltage on said control electrodes with respect to said cathodes and means connecting the anode and cathode of said first tube across the relay winding in the rectifier output circuit such that a positive voltage is placed on the anode of said first tube with respect to the cathode upon energization of said rectifier.

HARRY M. WILSON.

REFERENCES CITED

The following references are of record in the file of this patent:

UNITED STATES PATENTS

| Number | Name | Date |
|---|---|---|
| 1,866,459 | Gebhard | July 5, 1932 |
| 2,402,472 | Usselman | June 18, 1946 |
| 2,457,112 | Abercrombie et al. | Dec. 28, 1948 |